Feb. 4, 1958 C. L. HERBST ET AL 2,822,468
APPARATUS FOR DEMODULATING A SIGNAL
Filed March 10, 1954 5 Sheets-Sheet 1

INVENTOR.
CLARENCE L. HERBST
CHARLES J. WACKER
By Charles C. Reif
ATTORNEY

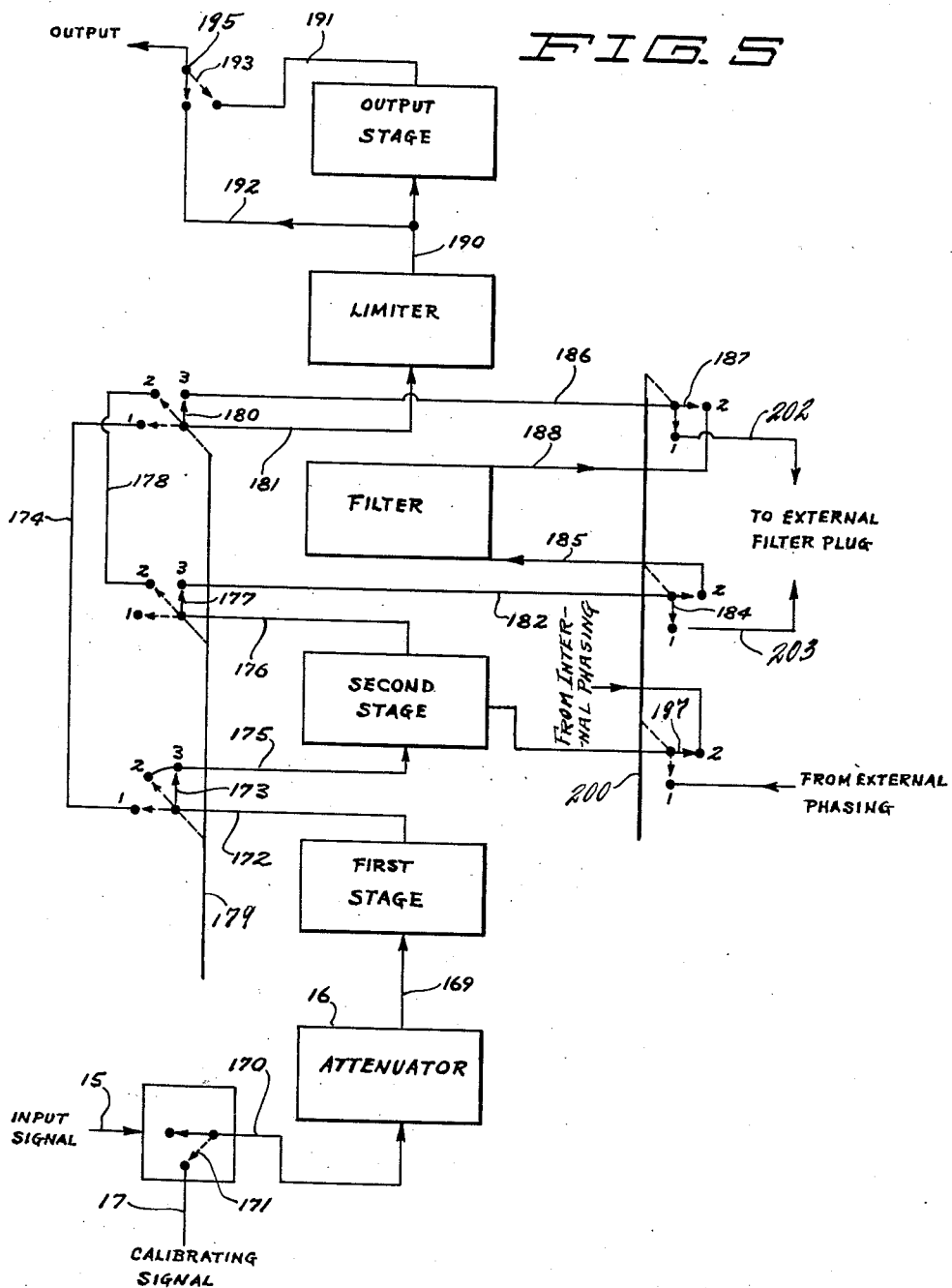

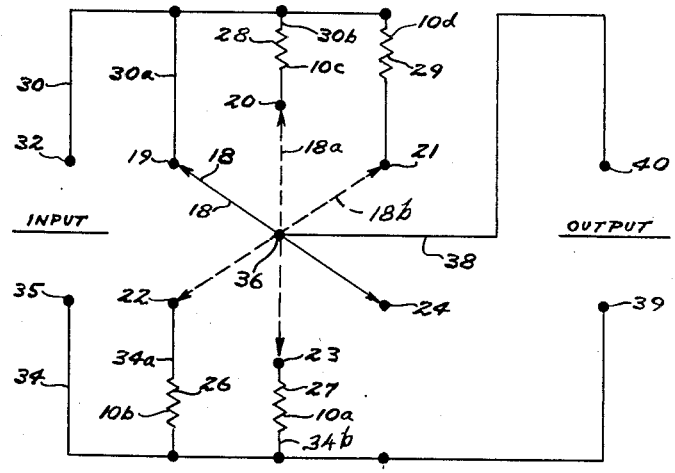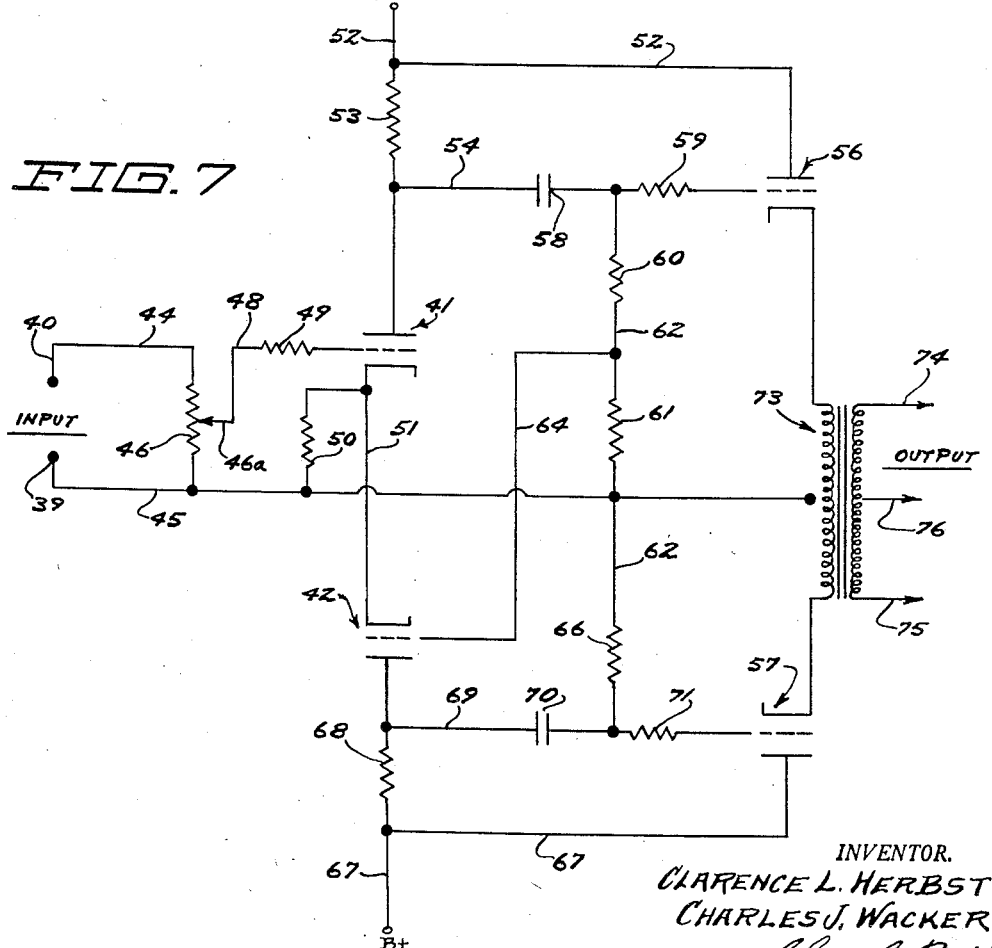

Feb. 4, 1958 C. L. HERBST ET AL 2,822,468
APPARATUS FOR DEMODULATING A SIGNAL
Filed March 10, 1954 5 Sheets-Sheet 4

INVENTOR.
CLARENCE L. HERBST
CHARLES J. WACKER
Chas. C. Reif
ATTORNEY

Feb. 4, 1958    C. L. HERBST ET AL    2,822,468
APPARATUS FOR DEMODULATING A SIGNAL
Filed March 10, 1954    5 Sheets-Sheet 5
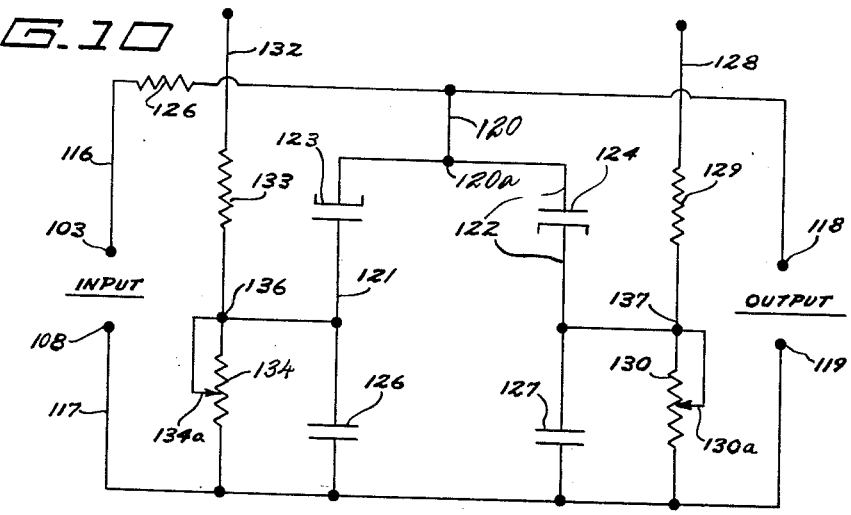
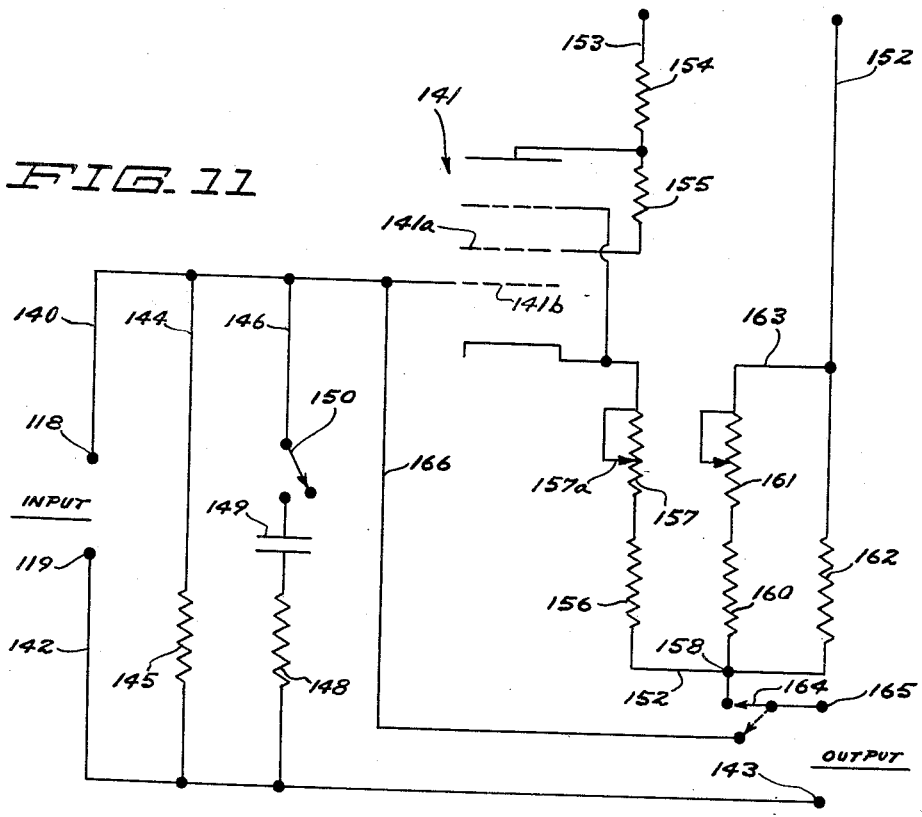
INVENTOR.
CLARENCE L. HERBST
CHARLES J. WACKER
BY Chas. C. Reif.
ATTORNEY

United States Patent Office 2,822,468
Patented Feb. 4, 1958

2,822,468

APPARATUS FOR DEMODULATING A SIGNAL

Clarence L. Herbst, St. Paul, and Charles J. Wacker, Minneapolis, Minn., assignors to Northern Pump Company, Minneapolis, Minn., a corporation of Minnesota Application March 10, 1954, Serial No. 415,306

7 Claims. (Cl. 250—27)

This invention relates to a demodulator apparatus. Demodulator apparatus are now used to transform certain signals to secure certain results and to secure recordings of one or more characteristics of these signals. The signals are thus changed so as to be applicable to a wide variety of output loading and can be graphed by suitable instruments such as the well known oscillographs. Such demodulator apparatus has heretofore been somewhat limited or unsatisfactory where accurate performance is desirable and often necessary, as where high versatility is necessary, as in instrumentation used in connection with control of certain mechanisms, such as gun training devices and servo-mechanisms.

It is an object of this invention to provide a demodulator apparatus which will constitute a high-performance testing instrument and a very versatile test instrument.

It is also an object of this invention to provide a demodulator apparatus comprising a series of electrical and electronic circuits for changing a signal, which demodulator apparatus provides a high degree of linear, accurate and transient-free results.

It is another object of this invention to produce a demodulator apparatus comprising a combination of electrical and electronic circuits designed to produce the desired results with a versatility beyond the scope of previous instruments both in respect to the range and the nature of the input signals dealt with, in respect to the functional flexibility of said circuits.

It is a further object of this invention to produce a demodulator apparatus comprising a combination of electrical and electronic circuits which will receive an input signal and produce a signal that is the envelope of a modulated signal with a minimum of objectional effects.

It is still further an object of this invention to produce a demodulator apparatus adapted to be used with a wide variety of input signals and to produce a demodulated signal following faithfully the modulation envelope of the input signal with a minimum amount of distortion, ripple and transient effects.

It is a further object of this invention to produce a demodulator apparatus comprising a combination of electrical and electronic circuits adapted to amplify, rectify and filter alternating current signals to produce accurately an undistorted desired demodulated signal.

Another object of this invention is to produce a demodulator apparatus such as set forth in the above paragraph and including in said combination a phase inverter type of circuit, an attenuator and a gain control for setting the alternating current input at a said phase inverter stage to the level required.

These and other objects and advantages of the invention will be fully set forth in the following description made in connection with the accompanying drawings in which like reference characters refer to similar parts throughout the several views and in which:

Fig. 5 is a diagram of the arrangement of the various circuits used in the demodulator apparatus;

Fig. 6 is a schematic diagram of a constant impedance attenuator;

Fig. 7 is a schematic diagram showing circuits used in the demodulator apparatus;

Fig. 10 is a schematic diagram of an adjustable limiting circuit; and

Fig. 11 is a schematic diagram of the output circuit used.

Figures 1, 2:
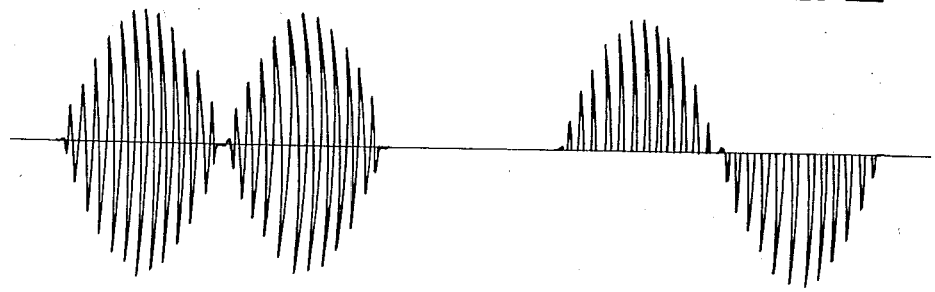
Fig. 1 is a graph of the signal to be demodulated which comprises the alternating current input.
Fig. 2 is a graph showing a demodulated signal.

Referring to the drawings, particularly Fig. 5, the arrangement of the circuits in the demodulator apparatus is shown. The input signal is applied to a conductor 15. This signal is first applied to the attenuator 16. If desired, a calibrating voltage signal can be introduced through the conductor 17. That is sometimes desirable to calibrate the signal to bring the same within the desired range of the instruments. As stated, the signal is first applied to the attenuator 16 shown diagrammatically in Fig. 6. It is desired that the loading impedance presented to the signal generating source remain constant. In the particular circuit illustrated this is accomplished by placing a resistance in parallel with the impedance connected to the output terminals of the attenuator when the resistance in series with the impedance connected to the output terminals is increased. The purpose of the attenuator is to reduce the input signal to a value convenient for the purposes at hand. The output of the attenuator will be referred to as the attenuated signal. The attenuator includes a three way switch 18 having contacts 18, 18a and 18b adapted to engage respectively contacts 19, 20 and 21 and 22, 23 and 24. Resistors 26 and 27 are disposed in series with the contacts 22 and 23 and resistors 28 and 29 are disposed in series with contacts 20 and 21 respectively. Conductor 30 extends from a contact 32 to contact 21 having therein the resistor 29. Conductors 30a and 30b extend from conductor 30 to contacts 19 and 20 respectively. Resistor 28 is in conductor 30b. Another conductor 34 extends from a contact 35 to contact or point 39 which is the output point. A conductor 34a extends from conductor 34 to contact 22 and has therein the resistor 26. A conductor 34b extends from conductor 34 to contact 23 and has therein resistor 27. When switch 18 is in the position shown, contact 19 is connected directly to the contact 36 or to the output conductor 38. When the switch 18 is in the position 18a the input voltage will be impressed across resistors 28 and 27. Resistors 28 and 27 are designed so that only one-half the input voltage will appear across contacts 35 and 36 due to the drop through resistor 28 but the presented impedance appearing across contacts 32 and 35 will remain the same. When switch 18 is in the position 18b the input voltage will be impressed across resistors 29 and 26. Resistors 29 and 26 are designed so that only one-tenth of the input voltage will appear across contacts 35 and 36 due to the drop through resistor 29 but the presented impedance appearing across circuit points 32 and 35 will remain the same. Thus the constant impedance attenuator provides a means for presenting a constant electrical loading to the signal generating source while varying the magnitude of the signal voltage to be applied to the other circuits in certain discrete steps. The attenuator changes the magnitude of the signal only, before it is applied to the subsequent stages or circuits. Conductor 34 extends to output point 39 and conductor 38 extends to output point 40.

The signal voltage modified by the attenuator is applied to the second stage or phase-inverter circuit illustrated schematically in Fig. 7. This circuit is a two tube circuit the same comprising tubes 41 and 42. A conductor 44 extends from point 40 and a conductor 45 extends from point 39. A variable resistor 46 is disposed between and connected to said latter conductors and the same functions as a gain control, permitting adjustment of the signal voltage appearing between contact member 39 and 46a to the level desired. The signal voltage is then applied to a conductor 48, and a current limiting resistor 49 to the grid element of tube 41. Tube 41 obtains its cathode bias through plate current flowing through a resistor 50 disposed between conductor 45 and a conductor 51, the latter connecting the cathodes of tubes 41 and 42. The current flowing through resistor 50 to conductor 51 represents the total plate currents of tubes 41 and 42. D. C. voltage is supplied to the plate of tube 41 through conductor 52 and through a resistor 53, said voltage being dropped by resistor 53 to the correct D. C. operating potential for a conductor 54 and the plate of tube 41. The A. C. signal output of tube 41 is applied to the grid of a tube 56 through a blocking condenser 58 and the current limiting resistor 59. The grid return circuit of tube 56 flows through resistors 60 and 61 the same being in series in a conductor 62 extending between conductor 54 and a conductor 45. A conductor 64 extends from conductor 62 to the grid of tube 42 so that a portion of the signal voltage is applied to said grid. Due to the action of the above mentioned tubes the signal voltage applied to the grid of tube 42 will be 180 degrees out of phase with the signal voltage applied to the grid of tube 41. These voltages on said respective grids can be made equal by proper adjustment of resistors 60 and 61. Tube 42 has its plate voltage supplied through a conductor 67 through a dropping resistor 68 in said conductor. The A. C. signal output of tube 42 is applied through a conductor 69, through a blocking condenser 70 therein and through a current limiting resistor 71 therein to the grid of a tube 57. Resistor 66 and conductor 62 provide a grid return circuit for tube 57. The tubes 56 and 57 receive the plate voltage directly and externally from the high voltage plate supply through conductors 52 and 67. The output of tubes 56 and 57 having been made equal and being 180 degrees out of phase, are in correct phase relationship to drive the primary of a coupling transformer 73. The output of the described circuits is delivered through conductors 74, 75 and 76 through the secondary of transformer 73. The circuit including tubes 41 and 42 is a phase inverter circuit and the circuit including tubes 56 and 57 is a cathode follower circuit. The function of the circuits illustrated in Fig. 7 is to provide an amplified double-ended output to the phase sensitive rectifier stage without incurring interaction between the stages due to loading effects.

Figure 8:
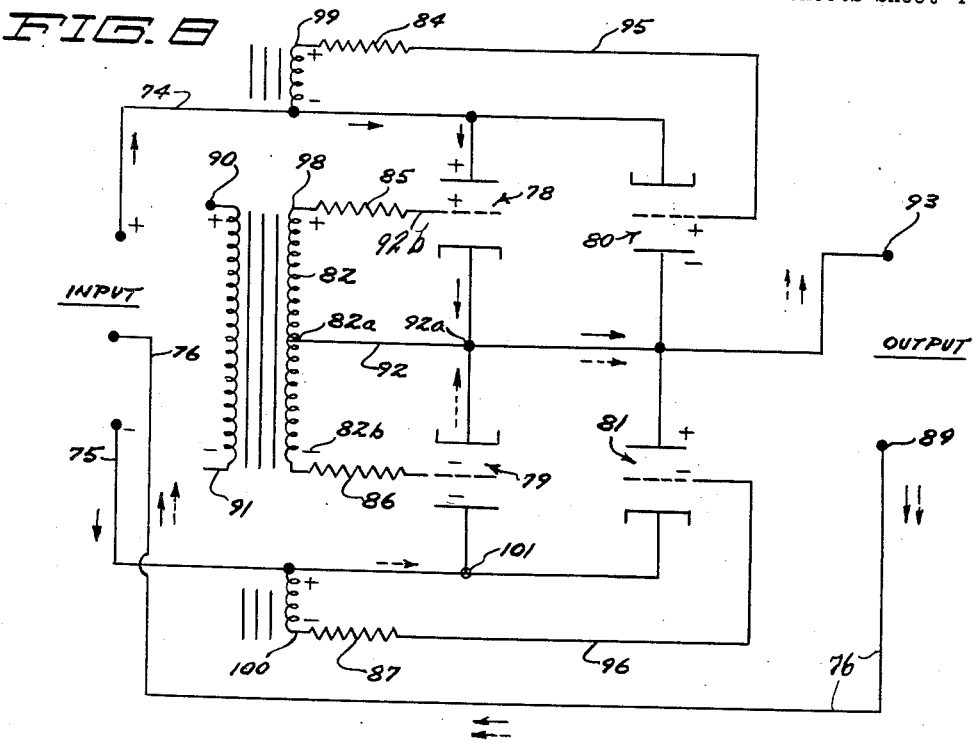
Fig. 8 is a schematic diagram of a phase-sensitive rectifier circuit used.

The output of these circuits shown in Fig. 7 is applied to a phase sensitive rectifier circuit shown in Fig. 8. This circuit comprises four triode tubes 78, 79, 80 and 81, a phasing transformer 82 and associated resistors 84, 85, 86 and 87. A conductor 74 extends to the cathode of tube 80 and is connected to the plate of tube 78. A conductor 75 extends to the cathode of tube 81 and is connected to the plate of tube 79. A conductod 76 extends to an output point 89. Voltage is applied to the primary of transformer 82 at the points 90 and 91 by conductors 90a and 91a respectively. The secondary of transformer 82 is connected to the grids of tubes 78 and 79 through resistors 85 and 86 respectively. A conductor 92 extends from the midpoint of the secondary of transformer 82 to an output point 93. The secondary of transformer 82 is also connected by conductors 95 and 96 to the grids of tubes 80 and 81 respectively resistors 84 and 87 being disposed in said conductors respectively. Conductor 92 is connected to the cathodes of tubes 78 and 79 and to the plates of tubes 80 and 81. The magnitude and polarity of the output at contacts 93 and 89 depend upon which of the tubes 78 and 79 is conducting, and the degree to which it is conducting. This in turn is determined by the tube potentials set up by the voltage input to conductors 74 and 75 and the reference voltage input at points 90 and 91 into transformer 82. The grid to cathode voltage of tube 78 at the grid of said tube and point 92a is determined by the secondary voltage of transformer 82 appearing between points 92b and point 98. Resistor 85 is a current limiting resistor. In a similar way the current to cathode voltages of tubes 79, 80 and 81 are determined by the secondary of transformer 82 at the points 82a, 82b; conductor 74 and point 99 and conductor 75 to point 100, respectively. Resistors 86, 84 and 87 are current limiting resistors. The plate to cathode voltage of tube 78, conductor 74 and point 92a, is determined by the input voltage applied between conductors 74 and 76. In a similar way, the plate to cathode voltage of tube 79 is determined by the input voltage at point 101 and point or contact 89. The plate to cathode voltage of tube 80 is determined by the input voltage at conductor 74 and point 92a and the plate to cathode voltage of tube 81 is determined by the input voltage at conductor 76 and point 101.

Figure 9:
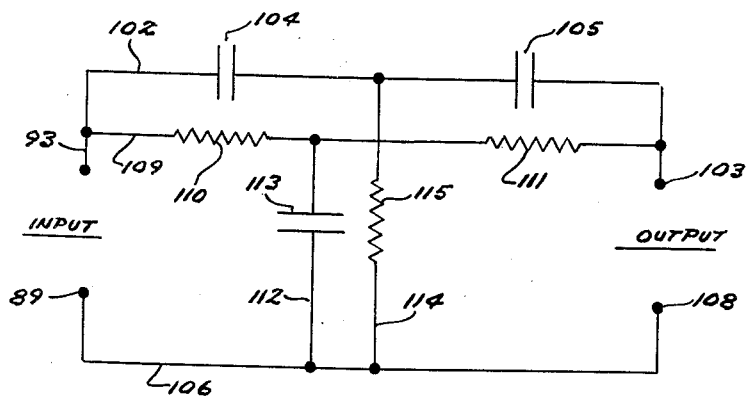
Fig. 9 is a schematic diagram of a filter circuit used.

To observe the operation of the circuit shown in Fig. 8, assume the instrument's phase relationships and polarities are as indicated by the positive and negative signs at the signal input, at conductors 74 and 75, and at the phasing or reference voltage input at the points 90 and 91. The resultant potentials on the tubes indicate that tube 78 will conduct and current will flow in the direction indicated by the solid arrows. One-half cycle later, all the voltages will reverse, and tube 79 will conduct and current will flow in the direction of the dotted arrows. If the other phase relationship had been assumed between the phasing and signal voltages, tubes 80 and 81 would have conducted on alternate half-cycles respectively, and the output current would flow in the opposite direction, thus producing an output voltage of opposite polarity. The greater the input signal on conductors 74 and 76 the greater will be the plate voltages appearing on tubes 78 and 79, and the greater will be the resultant output voltage. The output of the phase-sensitive rectifier, therefore is a full wave rectification of the input signal corresponding in polarity to the phase relationship between the input signal and phasing voltage, and corresponding in magnitude to the applied signal voltages. The object of the phase-sensitive rectifier is to provide a uni-directional output, corresponding in polarity and magnitude to the character of the input signal in such a manner that the modulation envelope of the input signal may be derived therefrom. The output of the phase-sensitive rectifier consists of a series of pulses which are uni-directional, occurring at twice the carrier frequency. This results in an apparent D. C. signal having a high ripple. To remove this ripple, the demodulated signal is filtered through the symmetrical twin-T filter shown schematically in Fig. 9.

Said filter consists of the conductor 102 extending from the input point 93 to the output point 103 and having therein the condensers 104 and 105. Another conductor 106 extends from input point 89 to the output point 108. A conductor 109 extends in parallel with conductor 102 and has therein the resistors 110 and 111. A conductor 112 extends between conductors 106 and 109 and has therein the condenser 113. A conductor 114 connects the center section of conductor 102 to conductor 106, the same having therein a resistor 115. The twin-T filter is employed because of its well-known sharp cut-off characteristics in the region of the null frequency, in this case being twice the carrier frequency. The null frequency, or even the type of filter employed, may be changed at the discretion of the operator in the event that other characteristics are desirable. Switching has been provided for this as illustrated in Fig. 5 which will be later described.

The filtered output from the points 103 and 108 of the filter is passed through an adjustable limiting circuit schematically illustrated in Fig. 10, inasmuch as it is sometimes desirable to impose a limit on the magnitude of the signal eventually applied to the recording instruments.

The limiting circuit is schematically shown in Fig. 10 and includes the conductors 116 and 117 extending respectively from the input points 103 and 108 to the output points 118 and 119. Conductor 116 has therein a resistor 126. A conductor 120 extends from conductor 116 and is connected to parallel conductors 121 and 122 having therein respectively the diode tubes 123 and 124 as well as the condensers 126 and 127. Conductors 121 and 122 extend to conductor 117. An adjustable positive voltage is applied through conductor 128 having therein the resistors 129 and 130 and this voltage can be adjusted by movable member 130a of resistor 130 which is connected to the cathode of tube 124 so that said voltage is applied to said cathode. Likewise a negative voltage is applied through conductor 132 which latter has therein the resistors 133 and 134 the same being adjustable by movable member 134a of resistor 134 connected to the plate of tube 123 so that said voltage is applied to said plate.

Tube 123 will conduct when the applied signal at conductors 116 and 117 causes point 120a to become negative with respect to point 136. Any voltage in excess of this will then appear as a voltage drop across resistor 126 and will not appear at the output points 118 and 119. Tube 124 will conduct when the applied signal at input points 103 and 108 causes point 120a to become positive with respect to circuit point 137. Any voltage in excess of this will then also appear as a voltage drop across resistor 126 and will not appear at the output points 118 and 119. Thus the voltage drops across resistors 134 and 130 determine the maximum signal that can be transmitted to the output points 118 and 119.

The condensers 126 and 127 are used to stabilize the voltage drops across resistors 134 and 130. By limiting the signal input to the final stages of the demodulator apparatus, the limiting circuit prevents excessive driving signals from being applied to the external instrumentation.

Figure 3:
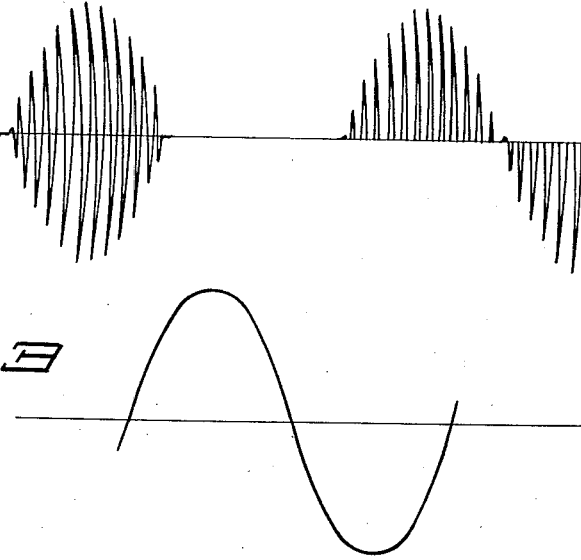
Fig. 3 is a graph of a demodulated and filtered signal showing the envelope of the input signal.

The final stage of the demodulator apparatus schematically shown in Fig. 11 is a cathode follower stage designed to couple the filtered, limited phase-sensitive rectifier output to an external recording instrument or any other load desired. Said latter circuit is schematically shown in Fig. 11. Said circuit comprises a conductor 140 extending from input point 118 to one grid of a tube 141. A conductor 142 extends from input point 119 to an output point 143. Another conductor 144 extends between conductors 140 and 142 and has therein a resistor 145. Another conductor 146 extends between conductors 140 and 142 and has therein a resistor 148 and condenser 149. A switch 150 is disposed in conductor 146 and can be moved to position to open said conductor. Tube 141 receives its operating potentials from a stabilized source of positive and negative potential through conductors 152 and 153 respectively. A resistor 154 in conductor 153 drops the positive voltage or potential to the correct point for the plate of tube 141 and a resistor 155 further drops voltage to the correct point for the screen grid 141a of tube 141. Conductor 152 extends to the cathode of tube 141 and has therein the resistor 156 and the adjustable resistor 157. Resistor 157 comprises the moving adjustable member 157a. The cathode potential of tube 141 is determined by plate current flowing through resistors 156 and 157 and this can be adjusted by movable member 157a of resistor 157. The voltage drop which would otherwise appear across the output impedance, between circuit points 158 and output point of contact 143 is cancelled out by an equal and opposite voltage produced by the voltage dividing action of resistors 161, 160 and 162 disposed as shown in Fig. 11, and the impedance of the load connected between output point 143 and circuit point 158. Resistors 162, 156 and 157 are disposed in conductor 152, resistor 157 being adjustable. Resistors 160 and 161 are disposed in the conductor 163 extending parallel to conductor 152, conductor 161 being adjustable. As stated conductor 152 extends to a stabilized source of negative voltage or potential. In actual practice the resistor 161 functions as a fine balance and variable resistor 157 functions as a coarse balance when centering the recording instruments. Conductor 144 and resistor 145 provide the grid return circuit for the grid 141b of the tube 141. Resistor 148 and condenser 149 can be cut in or out at will by the use of switch 150. These circuit elements are employed, when necessary, to improve circuit performance. Point 158 can be connected by a switch 164 to an output contact 165. In the event that the circuits for tube 141 are not required for isolation purposes switch 164 can be moved to connect output contact 165 to conductor 166 connected to conductor 140 so that input contact 118 is directly connected to output point 165. A graph of the output signal from output contacts 143 and 165 is shown in Fig. 3 and depicts the envelope of the input signal.

Referring to Fig. 5, this figure illustrates schematically the arrangement of the various circuits of the demodulator apparatus. As stated, the input signal enters at 15 and is delivered through a conductor 170 to the attenuator 16. A series of switches 173, 177 and 180 are provided. Each of these switches has three contacts or positions designated respectively 1, 2 and 3. Said switches are simultaneously moved by member 179 connected thereto. A conductor 172 extends from the First Stage circuit to switch 173. If switches 173, 177 and 180 are in position 1, the signal from the First Stage will go through conductors 174 and 181 to the Limiter circuit, thus by-passing the Second State and the Filter circuit. If switches 173, 177 and 180 are in position 2, the signal from conductor 172 from the First Stage will go through conductor 175 to the Second State and then through conductors 176, 178 and 181 to the Limiter circuit, thus by-passing the Filter circuit.

If switches 173, 177 and 180 are in number 3 position, the signal from the First Stage will go through conductors 172 and 175 to the Second Stage, through conductors 176, 182 and 185 to the Filter circuit, then through conductors 188, 186 and 181 to the Limiter circuit, and through conductor 190 to the Output Stage. With switches 173, 177 and 180 in the number 3 position, the signal is put through all the stages as described.

A switch 193 is provided connected to an output point 195. Switch 193 can be connected to a conductor 192 extending from the Limiter circuit so as to connect the Limiter to ouput point 195 and by-pass the output stage or circuit shown in Fig. 11.

A switch 171 is provided connected to conductor 170 of the attenuator. Switch 171 can be positioned to supply a calibrating signal to the input of the demodulator apparatus.

Three switches 197, 184 and 187 are provided, each having two contacts or positions numbered 1 and 2 respectively, said latter switches being simultaneously moved by a member 200 connected thereto. When said latter switches are in position 1, external phasing voltage is supplied to the second stage or circuit shown in Figure 8 as above described. Conductor 186 is also connected by switch 199 to a conductor 202 which is equipped to be connected to an external filter plug in case an external filter circuit is to be used in place of the circuit shown in Figure 9. Conductor 185 is also connected to a conductor 202 similarily equipped to be connected to said external filter. The signal would then be transmitted through conductor 182, switch 184 to conductor 203, through the external filter, through conductor 202, switch 187 and to conductor 186, switch 180 and conductor 181 to the limiter.

When switches 197, 184 and 187 are in position 2, the phasing voltage supplied to the second stage is taken from the internal power source of the demodulator apparatus. As above described if switch 177 is in number 3 position, the signal will be transmitted through conductor 182, switch 184 and conductor 185 to the filter circuit. Similarly, the signal will pass through conductor 188, switch 187 and through conductor 186 to switch 180 in position 3 and to the limiter through conductor 181.

Figure 4:
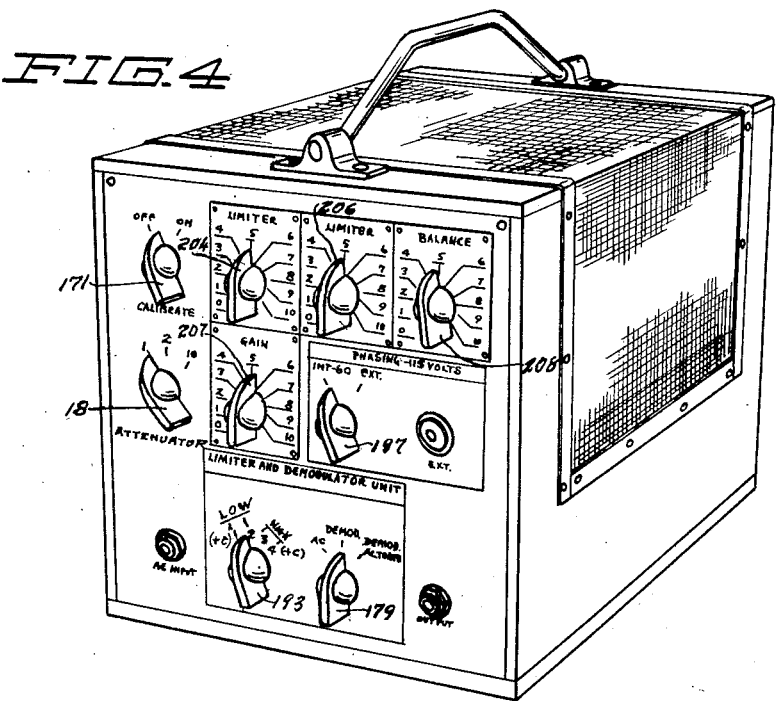
Fig. 4 is a perspective view of one form of the demodulator instrument of this invention as used in practice.

In Figure 4 a form of a demodulator apparatus used in practice is shown which is in the form of a box having a carrying handle. The calibrating switch 171 is shown as is the attenuator switch 18. The limiter adjustments are shown controlled by members or knobs 204 and 206. A gain control is shown adjustable by knob 207. The fine balance control for resistor 161 in the output stage is operated by knob 208. The low impedance output switch 193 appearing in Figure 5 is also shown. Member 179 which operates switches 173, 177 and 180 to their three positions is shown. The form shown in Figure 4 is compact, portable and very convenient in operation.

From the above description it will be seen that we have produced a demodulator apparatus which constitutes a high performance testing instrument and one which is quite versatile in its application. The particular sequence of units as described provides a high degree of linear, accurate and transient-free reproductions of the input signal, irrespective of the signal generating devices and any recording devices. The various circuits cooperate to produce such a result. Due to the combination of circuits, versatility beyond the scope of previous instruments is achieved, both as regards the range and nature of the input signals acceptable and as regards functional flexibility of the circuit. By means of the switching facilities provided the circuits can be adapted to any desired carrier frequency and provision is made for the entrance of this phasing frequency. Said switching also permits the ready by-passing of the filter circuit shown and the introduction of a different filter circuit. The output stage of the demodulator apparatus as well as the filter circuit can readily be eliminated. A calibrating voltage signal can be introduced if desired.

It is often desirable to derive and use the envelope of the demodulated signal. With the present demodulator apparatus the envelope of the demodulated signal can be traced directly by the oscillograph.

The device has been demonstrated in actual practice, found to be very successful and efficient and the same is in commercial use.

It will of course be understood that various changes may be made in the form, details, arrangement and proportions of the apparatus and in the steps and sequence of steps of the method without departing from the scope of applicants' invention, which, generally stated, consists in a method and device capable of carrying out the objects above set forth, such as disclosed and defined in the appended claims.

What is claimed is:

1. A demodulating system having in combination, first means providing an amplitude modulated wave, coupling means coupling said first means to a combined phase inverter and cathode follower to produce a double-ended output, a phase-sensitive rectifier for producing a unidirectional output, means coupling said double-ended output to said phase-sensitive rectifier, a twin-T filter whose rejection frequency is twice that of said wave, means coupling said unidirectional output to said twin-T filter whereby the demodulated envelope of said amplitude modulated wave may be derived therefrom.

2. The structure set forth in claim 1, and a limiting circuit having a pair of input terminals connected respectively to said twin-T filter and comprising of output terminals.

3. The structure set forth in claim 1, and an adjustable limiting circuit coupled to said twin-T filter for limiting the magnitude of the signal received from said twin-T filter and a cathode follower circuit coupled to the filtered and limited phase-sensitive rectifier output for connection to an external load.

4. The structure set forth in claim 2, a cathode follower circuit coupled to said last mentioned output terminals and having a pair of second output terminals, and a recording instrument coupled to said second output terminals.

5. A demodulator apparatus having in combination, a phase-sensitive rectifier comprising a transformer having a primary, a divided secondary having a central section with a center tap and end sections at either end of said central section, a pair of triode tubes, a second pair of triode tubes, a first signal voltage applied to said primary, means for applying voltage from said central section of said secondary in push-pull to the grids of said first mentioned tubes, a conductor from said tap connected to the cathodes of said first mentioned tubes and to the plates of said second mentioned tubes, a pair of input conductors for applying a second signal voltage connected to the plates of said first mentioned tubes and to the cathodes respectively of said second mentioned tubes, second conductors from said end sections of said transformer being respectively connected to the grids of said second mentioned tubes, third conductors from each of said end sections being respectively connected to each of said input conductors and a pair of output terminals, one of said last mentioned terminals being connected to said center tap, a third input terminal, and the other of said last mentioned terminals being connected to said third input terminal.

6. The structure set forth in claim 5, a cathode follower circuit comprising a pair of input terminals, first and second triode tubes, a second transformer the primary of which has a center tap, a first conductor connecting one of said terminals to said tap, a second conductor connecting said other terminal to said first mentioned conductor including a resistor, a third conductor connected to the grid of said first tube and having a terminal movable along said resistor, a fourth conductor connecting the cathodes of said tubes, fifth and sixth conductors respectively connected to the plates of said tubes and to respective input terminals for supplying direct current voltage to said plates, third and fourth triode tubes, a seventh conductor including a condensor connecting the grid of said third tube to said fifth conductor, an eighth conductor connecting the plate of said fourth tube to said fifth conductor, a ninth conductor including a condensor connecting the grid of said third tube to said sixth conductor, a tenth conductor connecting the plate of said second tube to said sixth conductor, eleventh and twelfth conductors having one end respectively connected to the respective ends of said primary of said second transformer and their other ends connected respectively to the cathodes of said third and fourth tubes and three spaced output conductors connected respectively to the ends and centers of the secondary of said second transformer and adapted to be respectively connected to the three input terminals set forth in claim 4.

7. The structure set forth in claim 5, a twin-T filter circuit having input terminals connected respectively to said output terminals and comprising a pair of output terminals, a limiting circuit having a pair of input terminals connected respectively to said last mentioned output terminals and comprising a pair of output terminals.

References Cited in the file of this patent

UNITED STATES PATENTS

| | | |
|---|---|---|
| 2,429,636 | McCoy | Oct. 28, 1947 |
| 2,429,788 | Atwood | Oct. 28, 1947 |
| 2,445,773 | Frost | July 27, 1948 |
| 2,453,958 | Anderson | Nov. 16, 1948 |
| 2,458,937 | Glass | Jan. 11, 1949 |
| 2,523,401 | Thompson | Sept. 26, 1950 |
| 2,652,489 | Robinson | Sept. 15, 1953 |
| 2,755,378 | Stover | July 17, 1956 |